(12) United States Patent
Zhang et al.

(10) Patent No.: US 9,316,498 B2
(45) Date of Patent: Apr. 19, 2016

(54) CROSS LINE LASER

(71) Applicant: CHANGZHOU HUADA KEJIE OPTO-ELECTRO INSTRUMENT CO., LTD., Changzhou (CN)

(72) Inventors: Ou Zhang, Changzhou (CN); Kai Fei, Changzhou (CN)

(73) Assignee: Changzhou Huada Kejie Opto-Electro Instrument Co., LTD., Jiangsu, Changzhou (CN)

(*) Notice: Subject to any disclaimer, the term of this patent is extended or adjusted under 35 U.S.C. 154(b) by 35 days.

(21) Appl. No.: 14/381,897

(22) PCT Filed: Dec. 10, 2012

(86) PCT No.: PCT/CN2012/001673
§ 371 (c)(1),
(2) Date: Aug. 28, 2014

(87) PCT Pub. No.: WO2013/131224
PCT Pub. Date: Sep. 12, 2013

(65) Prior Publication Data
US 2015/0052763 A1 Feb. 26, 2015

(30) Foreign Application Priority Data
Mar. 9, 2012 (CN) .......................... 2012 2 0086899

(51) Int. Cl.
*G01C 1/00* (2006.01)
*G01C 15/10* (2006.01)
*G01C 15/00* (2006.01)

(52) U.S. Cl.
CPC .................. *G01C 15/004* (2013.01)

(58) Field of Classification Search
CPC ...... G01C 15/004; G01C 15/08; G01C 15/10; G01C 15/105
USPC ............ 33/227, 262, 263, 281, 282, 283, 286
See application file for complete search history.

(56) References Cited

U.S. PATENT DOCUMENTS

| 5,227,865 A * | 7/1993 | Moriizumi ........... H03K 5/2454 327/432 |
| 5,992,029 A * | 11/1999 | Dong ..................... G01B 11/26 33/227 |
| 6,718,643 B2 | 4/2004 | Tamamura |
| 2006/0070251 A1* | 4/2006 | Wu ...................... G01C 15/004 33/286 |

(Continued)

FOREIGN PATENT DOCUMENTS

| CN | 201242441 | 5/2009 |
| CN | 201412731 | 2/2010 |
| CN | 202485675 | 10/2012 |

*Primary Examiner* — G. Bradley Bennett
(74) *Attorney, Agent, or Firm* — Harness, Dickey & Pierce, P.L.C.

(57) ABSTRACT

A cross line laser (100) comprises a shell and a hanging system (101). The hanging system has two laser modules (110) arranged oppositely on a same plane. Each laser module comprises a laser device (121), a collimation device (130), and a cylindrical lens (140). The cylindrical lens has a high refraction index. Lasers emitted by the laser device passes through the collimation device and are incident on the cylindrical lens, and are split by the cylindrical lens to form laser rays with a diffusion angle approximately larger than 180 degrees. Horizontal laser rays generated by the two laser modules intersect with each other, so as to form laser rays with a diffusion angle of 360 degrees.

8 Claims, 1 Drawing Sheet

(56) References Cited

U.S. PATENT DOCUMENTS

| | | | | |
|---|---|---|---|---|
| 2007/0000139 A1* | 1/2007 | Chen | ............... | G01C 15/004 33/286 |
| 2009/0241357 A1* | 10/2009 | Raschella | ............ | G01C 15/004 33/228 |
| 2011/0069322 A1* | 3/2011 | Hoffer, Jr. | ............ | G01B 11/002 356/615 |
| 2012/0327662 A1* | 12/2012 | Dang | ............... | G01C 15/004 362/259 |
| 2013/0182739 A1* | 7/2013 | Cheng | ............... | G01C 15/002 372/101 |
| 2013/0194793 A1* | 8/2013 | Bertsch | ............... | G02B 6/0001 362/231 |
| 2014/0304994 A1* | 10/2014 | Dumoulin | ............ | G01C 15/004 33/228 |

* cited by examiner

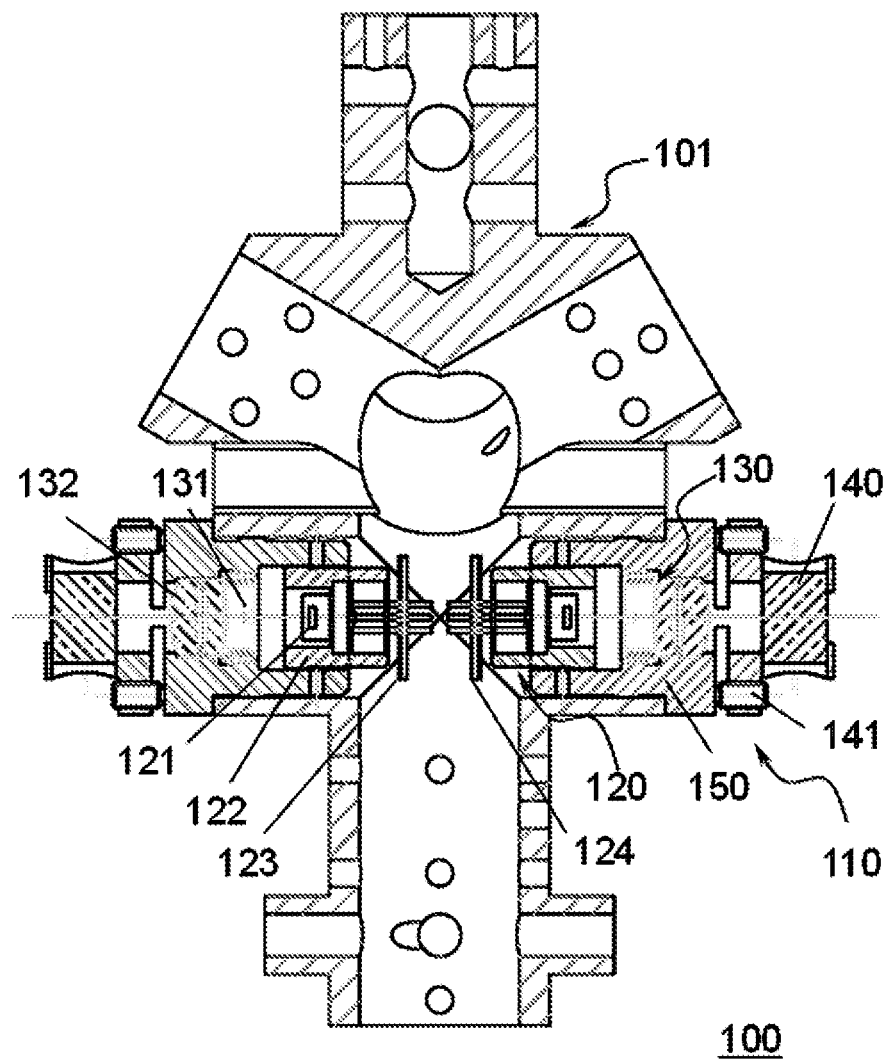

CROSS LINE LASER

FIELD OF THE INVENTION

The present Utility model relates to a laser device, particularly to a cross line laser.

BACKGROUND

With the continuous development of cross line lasers and the expansion of their applicability, clients' requirements for cross line lasers are becoming increasingly demanding.

For example, more and more clients are requiring that cross line lasers are capable of emitting a 360 degree laser line, i.e. the laser line covers the whole plane. However, for conventional cross line lasers, it is normally required to set one laser module at every 90 degree interval in a plane to implement the 360 degree laser line. The diffusion angle of the laser line emitted by every laser module is larger than 90 degrees, approximately ranging from 120 degrees to 150 degrees. Therefore, four identical laser modules are needed altogether. The conventional cross line laser occupies a high volume of space and requires high-cost materials.

Furthermore, it takes a long time to calibrate the laser line emitted by the four laser modules onto the same plane.

Therefore, a 360 degree cross line laser with low-occupied space volume, low cost and convenient adjustment is urgently needed.

SUMMARY OF THE INVENTION

In order to overcome the above defects, the object of the present Utility model is to provide a 360 degree cross line laser with low-occupied space volume, low cost and convenient adjustment.

In order to implement the above object, the present Utility model provides a cross line laser comprising a shell and a hanging system. The hanging system has two laser modules arranged oppositely on the same plane. Each laser module comprises a laser device, a collimation device, and a cylindrical lens. The cylindrical lens has a high refraction index. Lasers emitted by the laser device pass through the collimation device and are incident on the cylindrical lens, and are split by the cylindrical lens to form laser rays with a diffusion angle approximately larger than 180 degrees. Horizontal laser rays generated by the two laser modules intersect with each other, so as to form laser rays with a diffusion angle of 360 degrees.

Preferably, in the present Utility model, the laser modules further comprise a lens cone, which successively houses the laser device, the collimation device and the cylindrical lens.

Preferably, in the present Utility model, the laser modules further comprise a laser base housed in the lens cone for clamping the laser device.

Preferably, in the present Utility model, the collimation device further comprises a pressing ring and a lens module.

Preferably, in the present Utility model, the laser modules further comprise an adjustment device for adjusting the cylindrical lens.

Preferably, in the present Utility model, the laser device further comprises an insulation pad and a circuit board of the laser device.

Preferably, in the present Utility model, the cylindrical lens is made of dense lanthanum flint glass, particularly H-ZLaF75.

Based on the above settings, the cross line laser provided by the present Utility model can achieve a cross laser line with 360 degree diffusion angle by only using two laser modules. Compared with the prior art, it saves space of two laser modules and reduces costs accordingly. At the same time, this adjustment is more convenient than the prior art.

BRIEF DESCRIPTION OF THE DRAWINGS

FIG. 1 is a schematic diagram of one preferred embodiment of the present Utility model.

DETAILED DESCRIPTION OF THE INVENTION

The advantages of the present Utility model will be described in detail by reference to the drawings and the embodiments as follows.

As shown in FIG. 1, it is a schematic diagram of the cross line laser 100 provided by one preferred embodiment of the present Utility model. The cross line laser comprises a shell (not shown) and a hanging system 101.

The hanging system 101 has two laser modules 110 arranged oppositely on a same plane. Each laser module 110 comprises a laser assembly 120, a collimation device 130, a cylindrical lens 140 and a lens cone 150 successively housing the above devices.

The laser assembly 120 comprises a laser device 121, a laser base 122 housed in one end of the lens cone 150 for clamping the laser device 121, an insulation pad 123 and a circuit board 124 for controlling the laser circuit.

The collimation device 130 comprises a pressuring ring 131 and a lens module 132. The lens module 132 can be made up of convex lens and concave lens with same focal length. The lens module can also be made up of combinations of other different forms of lenses.

The cylindrical lens 140 interconnects with the adjustment device 141 and both of them are housed at the other end of the lens cone 150. The adjustment device 141 can be used to adjust the position of the cylindrical lens. The cylindrical lens 140 is made of material with high refraction index such as dense lanthanum flint glass. In this embodiment, the material of cylindrical lens 140 is H-ZLaF75 dense lanthanum flint glass.

Through the above settings, in a laser module 110, lasers emitted by the laser device 121 will firstly pass through the lens modules 132 of the collimation device 130 to be collimated. Then the lasers are incident on the cylindrical lens 140. After that they are split by the cylindrical lens 140 to form laser rays with a diffusion angle approximately larger than 180 degrees. Thus, two horizontal laser rays generated by the two laser modules arranged oppositely on a same plane intersect with each other, so as to form laser rays with a diffusion angle of 360 degrees.

By means of the above cross line laser 100, a cross laser line with 360 degree diffusion angle can be created by use of only two laser modules. Compared with the prior art, it saves space and reduces costs accordingly. In addition, the adjustment is more convenient than the prior art because of only using two laser modules.

It should be noted that the embodiments of the present invention has a preferred implementation, and will not limit the present invention in any form, and any technician skilled in the field may change or modify equivalent effective embodiments by using the above-described technique. Whenever the contents do not depart from the technical proposal in the present invention, any revision or equivalent change and modification of the above embodiments according to the technical substance of the present invention are all in the scope of the technical proposal in the present invention.

The invention claimed is:

1. A cross line laser comprises a shell and a hanging system, characterized in that, the hanging system has two laser modules arranged oppositely on a same plane, each laser module comprises:
   a laser device, a collimation device, and a cylindrical lens; the cylindrical lens has a high refraction index;
   lasers emitted by the laser device pass through the collimation device and are incident on the cylindrical lens, and are split by the cylindrical lens to form laser rays with a diffusion angle approximately larger than 180 degrees;
   horizontal laser rays generated by the two laser modules intersect with each other, so as to form laser rays with a diffusion angle of 360 degrees.

2. The cross line laser according to claim 1, characterized in that,
   the laser modules further comprise a lens cone successively housing the laser device, the collimation device and the cylindrical lens.

3. The cross line laser according to claim 2, characterized in that,
   the laser modules further comprise a laser base housed in the lens cone for clamping the laser device.

4. The cross line laser according to claim 2, characterized in that,
   the collimation device further comprises a pressing ring and a lens module.

5. The cross line laser according to claim 2, characterized in that,
   the laser modules further comprise an adjustment device for adjusting the cylindrical lens.

6. The cross line laser according to claim 2, characterized in that,
   the laser device further comprises an insulation pad and a circuit board of the laser device.

7. The cross line laser according to claim 1, characterized in that,
   the cylindrical lens is made of dense lanthanum flint glass.

8. The cross line laser according to claim 7, characterized in that,
   the material of the cylindrical lens is H-ZLaF75 dense lanthanum flint glass.

* * * * *